US010871851B2

(12) United States Patent
Adams et al.

(10) Patent No.: US 10,871,851 B2
(45) Date of Patent: Dec. 22, 2020

(54) ELECTRONIC DEVICE AND METHOD FOR ONE-HANDED OPERATION

(71) Applicant: BlackBerry Limited, Waterloo (CA)

(72) Inventors: Neil Patrick Adams, Waterloo (CA); Joseph Eytan Benedek, Thornhill (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 15/683,607

(22) Filed: Aug. 22, 2017

(65) Prior Publication Data

US 2019/0064990 A1    Feb. 28, 2019

(51) Int. Cl.
| | | |
|---|---|---|
| *G06F 3/041* | (2006.01) | |
| *G06F 3/0488* | (2013.01) | |
| *G06F 3/0481* | (2013.01) | |
| *G06F 3/0482* | (2013.01) | |

(52) U.S. Cl.
CPC .......... *G06F 3/0416* (2013.01); *G06F 3/0412* (2013.01); *G06F 3/0482* (2013.01); *G06F 3/0488* (2013.01); *G06F 3/04817* (2013.01); *G06F 3/04883* (2013.01); *G06F 3/04886* (2013.01)

(58) Field of Classification Search
CPC .. G06F 3/0416; G06F 3/0412; G06F 3/04817; G06F 3/0482; G06F 3/0488
See application file for complete search history.

(56) References Cited

U.S. PATENT DOCUMENTS

| | | | |
|---|---|---|---|
| 2012/0192078 A1 | 7/2012 | Bai et al. | |
| 2014/0282051 A1* | 9/2014 | Cruz-Hernandez | ..... G06F 3/016 715/744 |
| 2015/0160849 A1* | 6/2015 | Weiss | ...................... G06F 3/044 345/174 |
| 2016/0196041 A1 | 7/2016 | Lavoie et al. | |
| 2017/0235484 A1* | 8/2017 | Griffin | ................ H04M 1/0214 715/773 |
| 2018/0239509 A1* | 8/2018 | Hinckley | .............. G06F 3/0488 |

FOREIGN PATENT DOCUMENTS

EP    2713261 A2    4/2014

OTHER PUBLICATIONS

Karlson and Bederson., "ThumbSpace: Generalized One-Handed Input for Touchscreen-Based Mobile Devices," IFIP Conference on Human-Computer Interaction, LNCS 4662, Part I, Sep. 2007, pp. 324-338.
European Patent Application No. 18189869.3, Extended European Search Report dated Feb. 14, 2019.

* cited by examiner

*Primary Examiner* — Charles V Hicks
(74) *Attorney, Agent, or Firm* — Borden Ladner Gervais LLP; Todd Keeler

(57) ABSTRACT

A method includes displaying a user interface having selectable features on the touch-sensitive display, determining that the electronic device is in a one-handed mode, determining that at least one of the selectable features of the user interface is displayed in an inaccessible portion of the touch-sensitive display, displaying, in an accessible portion of the touch sensitive display, an additional selectable feature associated with the at least one of the selectable features displayed in the inaccessible portion, and in response to receiving a selection of the additional selectable feature, performing a function associated with the at least one of the selectable features.

19 Claims, 8 Drawing Sheets

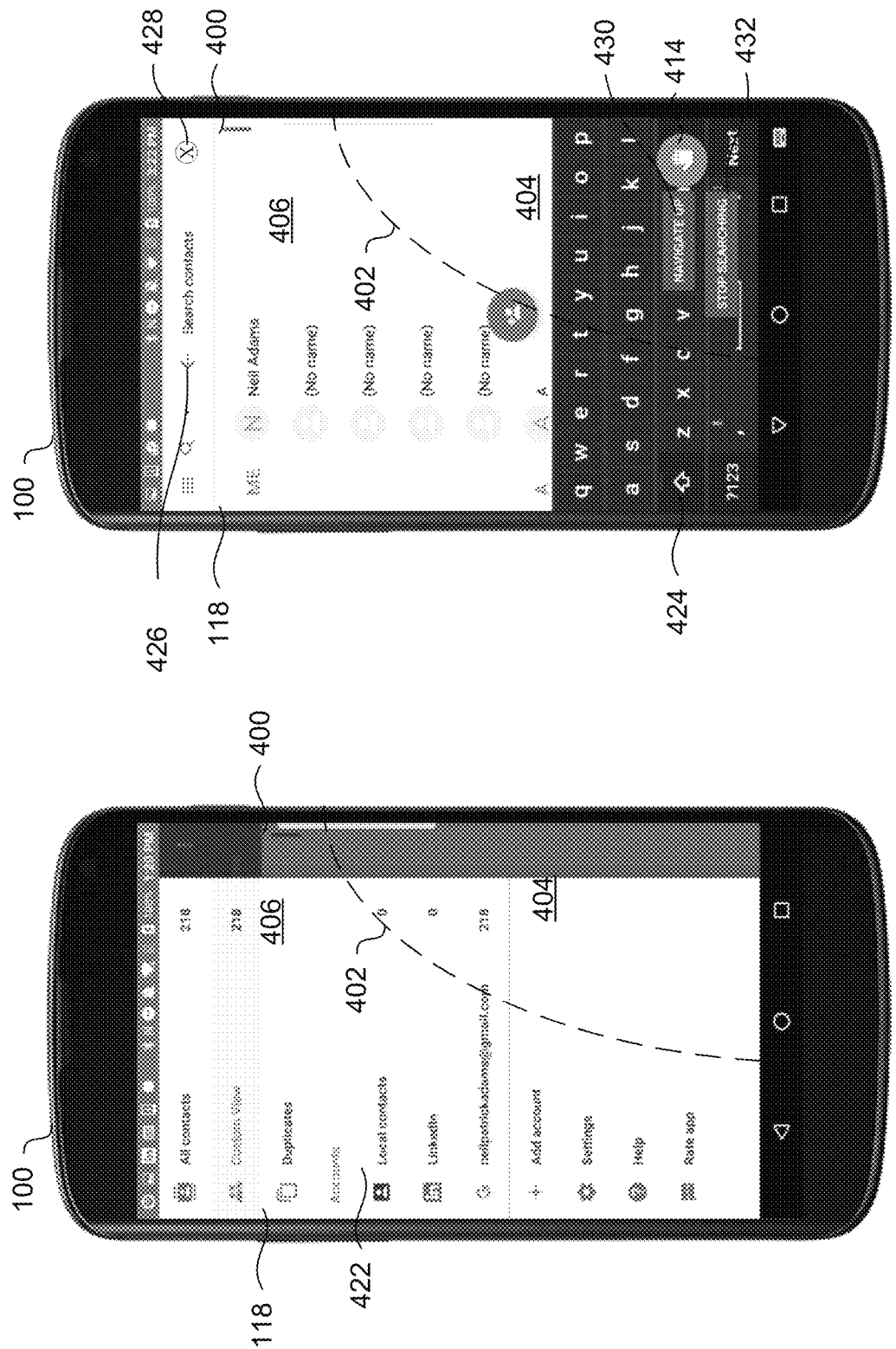

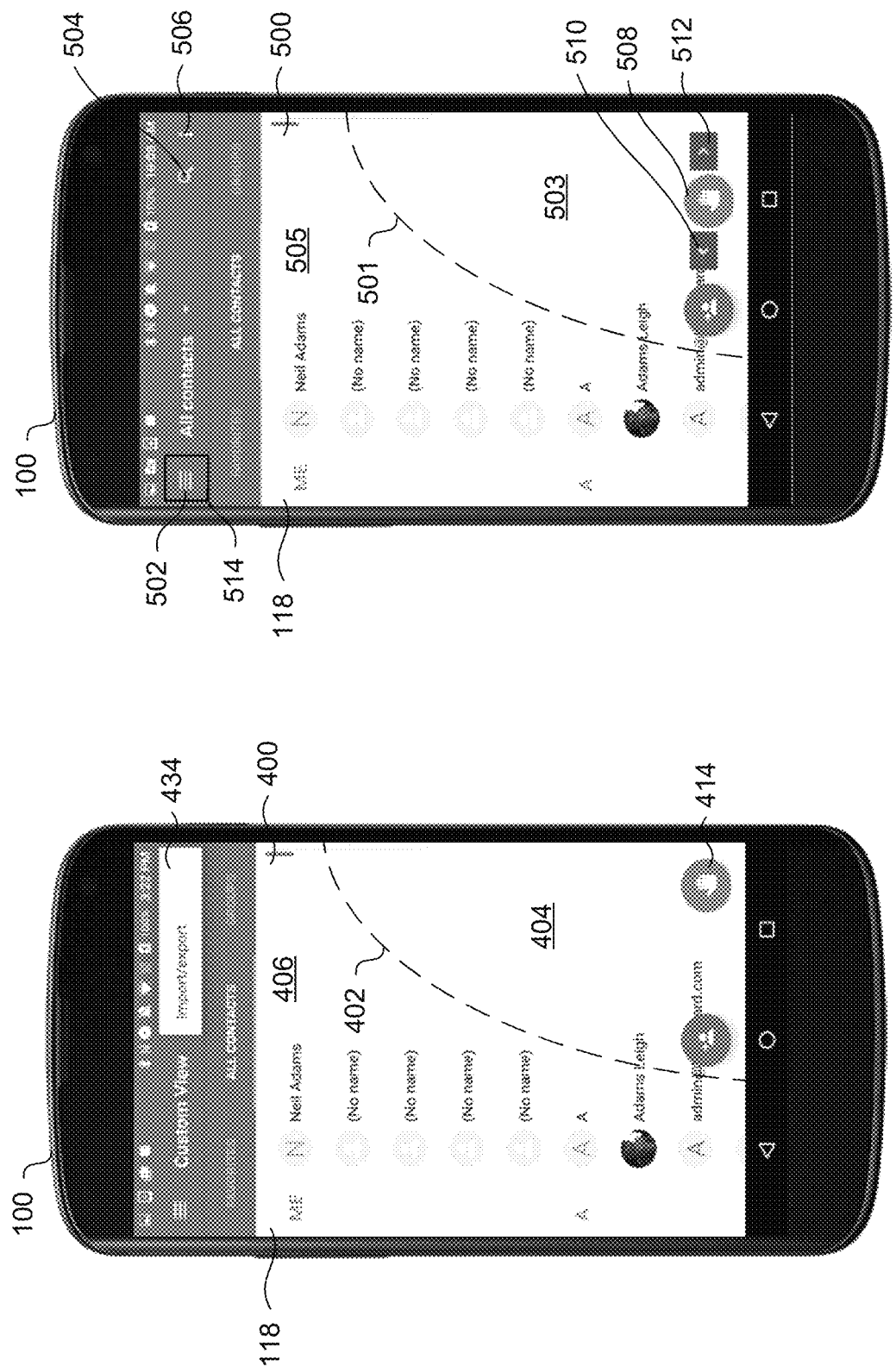

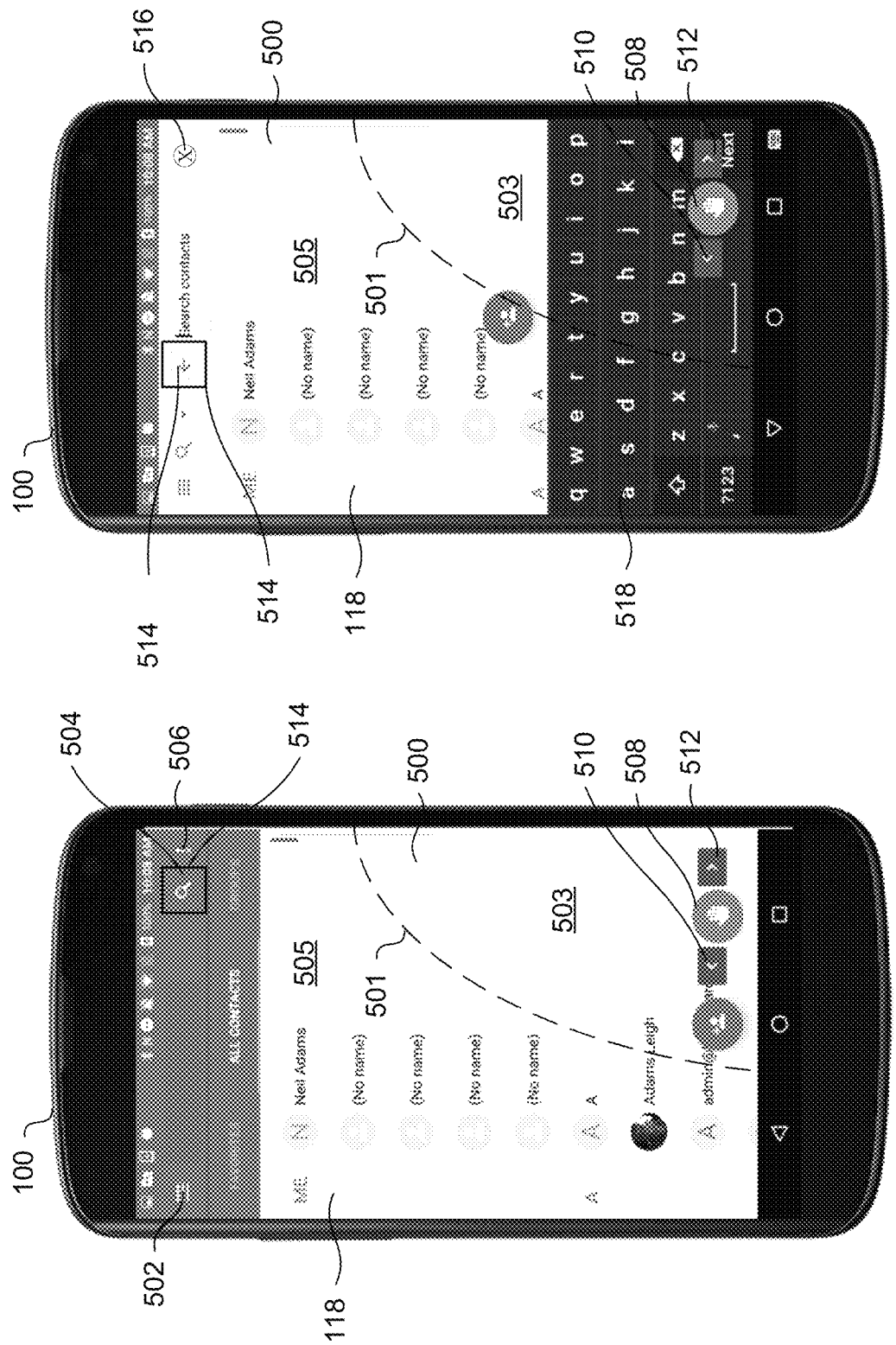

ELECTRONIC DEVICE AND METHOD FOR ONE-HANDED OPERATION

FIELD OF TECHNOLOGY

The present disclosure relates to electronic devices including, but not limited to, portable electronic devices and operating portable electronic devices with one hand.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth® capabilities.

Often users will use an electronic device with one hand. However, depending on the dimensions of the electronic device, some selectable features of the electronic device may not be accessible to the user when the electronic device is operated by one hand.

Improvements in devices and in operating electronic devices one-handed are desirable.

BRIEF DESCRIPTION OF THE DRAWINGS

Embodiments of the present disclosure will now be described, by way of example only, with reference to the attached figures, in which:

FIGS. 4A through 4E illustrate an example of a one-handed mode of an electronic device in accordance with the flow chart of FIG. 2;

FIGS. 5A through 5C illustrate another example of a one-handed mode of an electronic device in accordance with the flow chart of FIG. 2.

DETAILED DESCRIPTION

Figure 1:
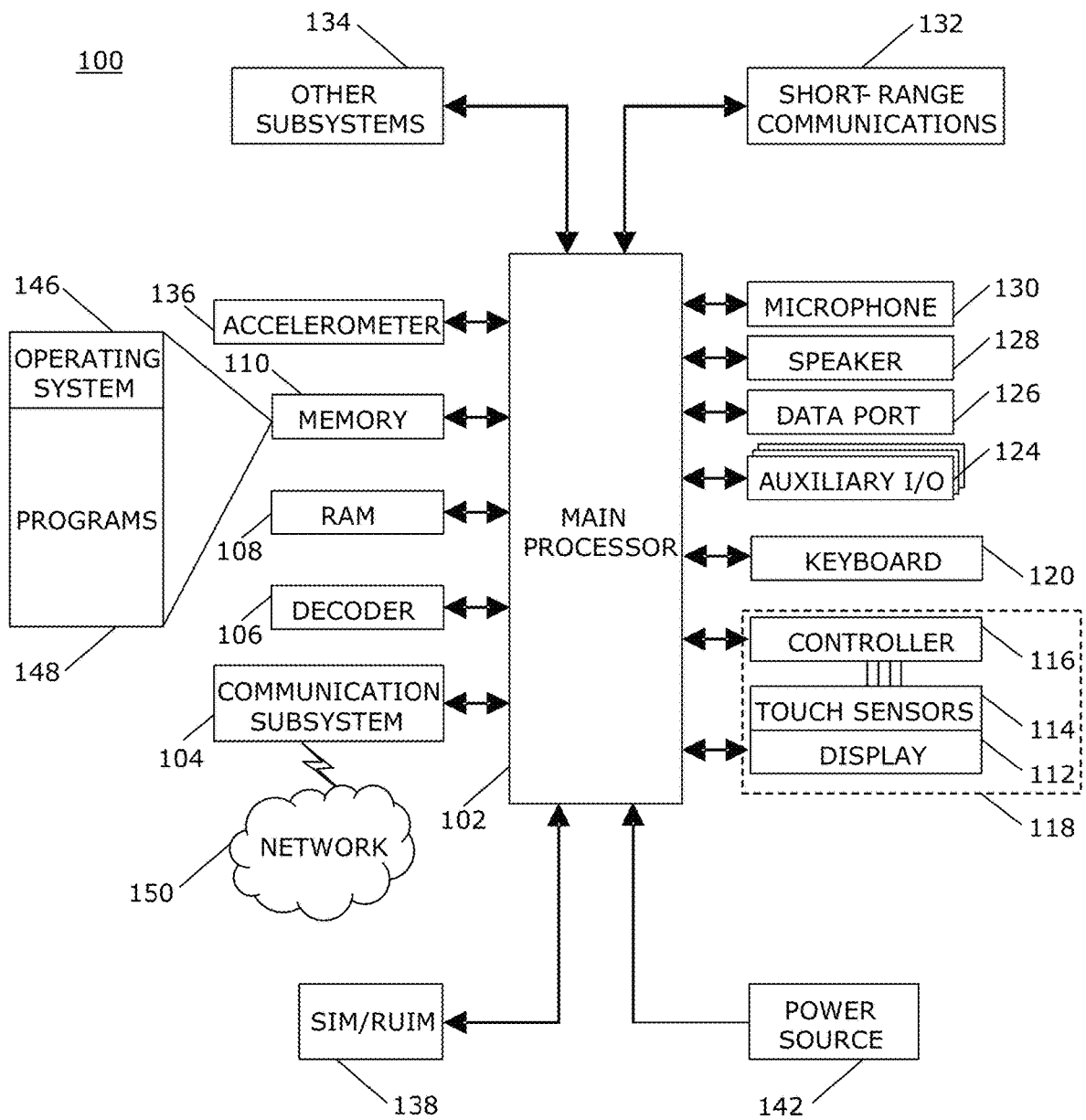
FIG. 1 is a block diagram of an example of a portable electronic device in accordance with the disclosure.

The following describes an electronic device and a method of enabling one handed operation of a portable electronic device. The method includes displaying a user interface having selectable features on the touch-sensitive display, determining that the electronic device is in a one-handed mode, determining that at least one of the selectable features of the user interface is displayed in an inaccessible portion of the touch-sensitive display, displaying, in an accessible portion of the touch sensitive display, an additional selectable feature associated with the at least one of the selectable features displayed in the inaccessible portion, and in response to receiving a selection of the additional selectable feature, performing a function associated with the at least one of the selectable features.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as cellular phones, cellular smart-phones, wireless organizers, personal digital assistants, wirelessly enabled notebook computers, tablet computers, mobile internet devices, electronic navigation devices, and so forth.

A block diagram of an example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for handsfree use. The keyboard 120 includes a plurality of keys, which may be mechanical keys that include mechanical switches or contacts for input to the electronic device 100 when a mechanical key of the keyboard is depressed by a sufficient amount to oppose a bias of the mechanical key. Alternatively, or in addition, the keys of the keyboard may include touch sensors coupled to a controller to detect touch input thereon.

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, one or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch-sensitive display 118 includes a display area in which information may be displayed, and a non-display area extending around the periphery of the display area. Information is not displayed in the non-display area by the display. The non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area.

In some instances, it may be desirable for a user to operate the electronic device 100 with one hand, which is referred to as one-handed operation. During one-handed operation, a user will typically interact with the touch-sensitive display 118 utilizing the thumb of the hand in which the user is holding the electronic device 100. Depending on the size of the touch-sensitive display 118, a user may have difficulty reaching all selectable features included in a graphical user interface displayed on the touch-sensitive display 118 with their thumb during one-handed operation. For example, if a user is performing one-handed operation of the electronic device 118 with their right hand, then the user may easily be able to interact with selectable features displayed in a lower right portion of the touch-sensitive display with the thumb of the right hand. However, selectable features displayed in, for example, an upper left portion may be out of the user's reach during one-handed operation. In the present disclosure, terms such as "upper", "lower", "right" and "left" refer to directions relative to the orientation that the electronic device 100 is being operated in by the user, and are not intended to be otherwise limiting.

To overcome the challenges presented in one-handed operation, the present disclosure provides displaying an additional selectable feature on the touch-sensitive display 118 when the electronic device is in a one-handed mode. The additional selectable feature is displayed in a portion of the touch-sensitive display 118 that is easily accessible to a user of the electronic device 100 during one-handed operation. The additional selectable feature is associated with selectable features displayed on portions of the touch-sensitive display 118 that are not easily accessible by the user during one-handed operation such that selecting the additional selectable feature causes the electronic device 100 to perform an operation associated with one of the selectable features that is not easily accessible to the user during one-handed operation.

Figure 2:
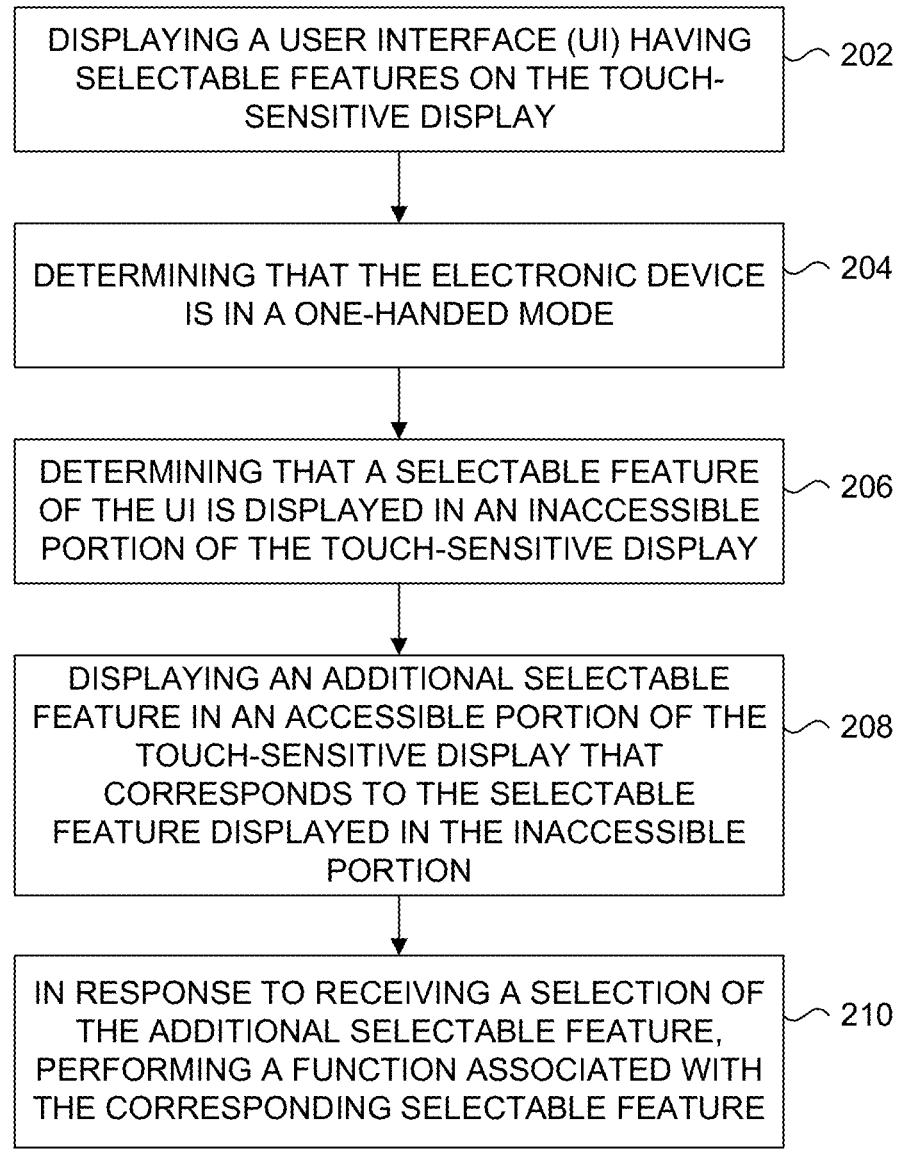
FIG. 2 is a flowchart illustrating a method of facilitating one-handed operation of an electronic device according to an embodiment.

A flowchart illustrating a method of facilitating one-handed operation of an electronic device 100 is shown in FIG. 2. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor 102 of the electronic device to perform the method may be stored in a computer-readable storage medium, such as a non-transitory computer-readable medium.

At 202, a user interface (UI) that includes one or more selectable features is displayed on a touch-sensitive display 118. The selectable features are elements of the UI that may each be associated with a respective function of the electronic device 100 such that selection of a selectable feature causes the electronic device 100 to perform the associated function. A selectable feature may be selected by touching a region of the touch-sensitive display 118 that is associated with that selectable feature. The region associated with a selectable feature may generally correspond to the region of the touch-sensitive display 118 on which the selectable feature is displayed. Examples of selectable features include icons and hyperlinks.

At 204, a determination is made that the electronic device 100 is in a one-handed mode. A one-handed mode may be initiated by a user entering an input into the electronic device 100 to initiate a one-handed mode. For example, one-handed mode may be entered by the user inputting a specific gesture on the touch-sensitive display 118, by pressing a key on the electronic device 100, such as for example a key of keyboard 120, or by any other input. As described in more detail below, the one-handed mode may include a right-handed mode, in which the electronic device 100 is operated one-handed by a user's right hand, and a left-handed mode in which the electronic device 100 is operated one-handed by a user's left hand.

The electronic device 100 may be configured to operate in a right handed or a left handed mode by default when the electronic device 100 is in the one-handed mode. The default handedness of the one-handed mode may be configured by a user, for example, in a settings for the one-handed mode. As described in more detail below, the electronic device 100 may determine whether the electronic device 100 is being operated one-handed by the user's right or left hand and, based on the determination, automatically enter one-handed mode in either of the right handed mode or the left handed mode. For example, if the default setting for the one-handed mode is a right handed mode, and if the user changes to a left handed mode, either once or after multiple times, then the electronic device 100 changes the default handedness to the left handed mode.

In another example, the electronic device 100 may initiate a one-handed mode automatically based on determining that the user is operating the electronic device 100 in a one-handed operation. In an example, the electronic device 100 may determine that the user is operating the electronic device 100 in a one-handed operation based the shape of a touch area of touch input on the touch-sensitive display 118. For example, the shape of the touch area may be utilized to determine that a touch is performed by a thumb, rather than a finger, indicating that the user may be utilizing the device in a one-handed mode. The electronic device 100 may determine that a touch associated with a touch area is performed by a thumb, rather than a user's other fingers, based on, for example, the size or the shape, or both, of the touch area. For example, a touch area that exceeds a threshold size may be determined to be associated with a touch associated with a thumb.

Further, in some examples the electronic device 100 may determine whether a touch is performed by a user's right thumb or left thumb based on the shape of the touch area associated with the touch. The determination of whether the touch is performed by a user's right or left thumb may be utilized to determine that the electronic device 100 should enter a right-handed or left-handed mode, which are described in more detail below.

In another example, the electronic device 100 may determine that the user is operating the electronic device 100 in a one-handed mode based on touches detected by touch sensors located in a non-display area of the touch-sensitive display 118. For example, inadvertent touches detected in the non-display area located near the lower right corner of the touch-sensitive display 118 may indicate that the user is operating the electronic device 100 one-handed utilizing the right hand. Similarly, inadvertent touches detected in the non-display area located near the lower left corner of the touch-sensitive display 118 may indicate that the user is operating the electronic device 100 one-handed utilizing the left hand. In this way, touches detected in the non-display area may be utilized to determine the hand that the user is utilizing to operate the electronic device 100 in order to determine whether the electronic device 100 should enter a right-handed or a left-handed mode. Touches detected in the non-display area may include touches detected by touch sensors included within the keys of a keyboard 120 of the electronic device 100.

In other examples, one-handed operation of the electronic device 100 may be determined based on input received from other sensors of the electronic device 100 such as, for example, the accelerometer 136 or a gyroscope.

At 206 a determination is made that a selectable feature of the UI is displayed in an inaccessible portion of the touch-sensitive display 118. Determining a selectable feature at 206 may include determining that multiple selectable features are located in the inaccessible portion of the touch-sensitive display 118.

The inaccessible portion of the touch-sensitive display 118 is the portion of the touch-sensitive display 118 that a user cannot easily reach with their thumb when operating the electronic device 100 one-hand. An accessible portion of the touch-sensitive 118 is the portion of the display that the user can easily reach with their thumb when operating the electronic device 100 one-handed.

Figure 3B:
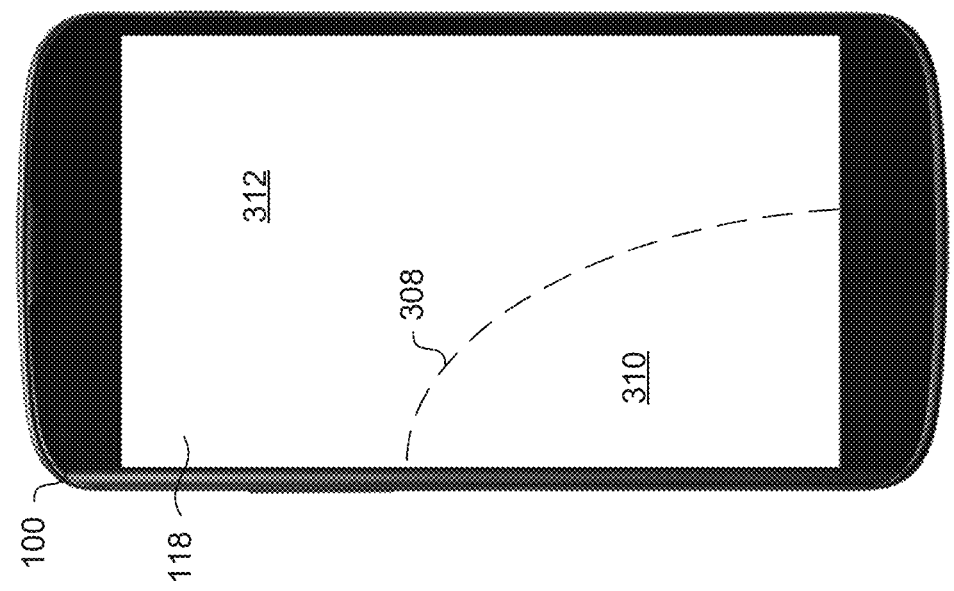
FIGS. 3A and 3B illustrates an example of an accessible portion and an inaccessible portion of a touch-sensitive display of an electronic device in accordance with the flow chart of FIG. 2.
Figure 3A:
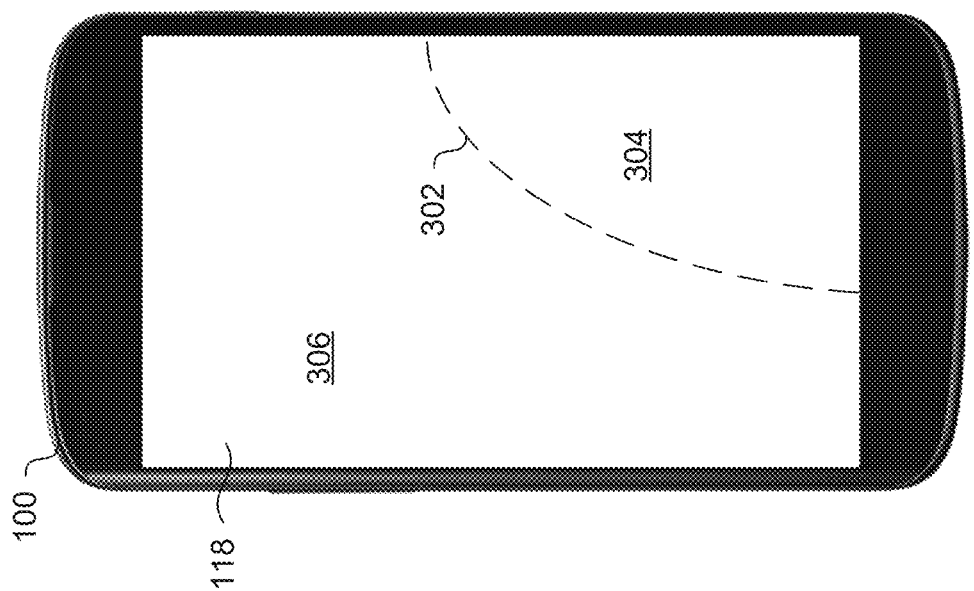

Referring to FIGS. 3A and 3B, illustrate the accessible and inaccessible portions of a touch-sensitive display 118 of an electronic device 100 in a right handed mode and a left handed mode. FIG. 3A shows an example of an electronic device 100 in a right handed mode in which the dashed line 302 shows an example boundary 302 between the accessible portion 304, which is easily accessible by a user's right hand thumb during one-handed operation, and the inaccessible portion 306 of the touch-sensitive display 118 for a right handed mode, which is not easily accessible by a user's hand thumb during one-handed operation. In the example shown in FIG. 3A, the accessible portion 304 is generally includes the lower right hand corner region of the touch-sensitive display, which is the portion of the touch-sensitive display 118 that may be easily accessed by the thumb of a user's right hand when the electronic device 100 is operated one-handed by the user's right hand.

FIG. 3B shows an example of an electronic device in left handed mode in which the dashed line 308 shows an example boundary between the accessible portion 310 and the inaccessible portion 312 of the touch-sensitive display 118 in a left handed mode. In the example shown in FIG. 3B, the accessible portion 310 is generally includes the lower left hand corner region of the touch-sensitive display, which is the portion of the touch-sensitive display 118 that may be accessed by the thumb of a user's left hand when the electronic device 100 is operated one-handed by the user's left hand.

In an example, the boundaries 302, 308 may be defined as a predefined distance from a lower right corner of the touch-sensitive display 118 in the right handed mode, as shown in FIG. 3A, or as a predefined distance from the lower left corner of the touch-sensitive display 118 in the left handed mode shown in FIG. 3B. The predefined distance may be adjusted by, for example, configuring the settings for the one-handed mode. In another example, the boundaries 302, 304 may be determined based on a user swiping their thumb across the touch-sensitive display 118 to determine the portion of the touch-sensitive display 118 that the user is able to easily access during one-handed operation. The user may perform such swiping across the touch-sensitive display 118 as part of a configuration for the one-handed mode.

Alternatively, or additionally, the boundaries 302, 308 may be determined by based on previous touches that a user has performed utilizing one hand. The determination may be based on touches that are performed without the user adjusting his or her hand prior to the touch.

Referring back to FIG. 2, an additional selectable feature is displayed in the accessible portion of the touch-sensitive display 118 at 208. The additional selectable feature corresponds to the one or more selectable features displayed in the inaccessible portion of the touch-sensitive 118, as determined at 206. The additional selectable feature may be, for example, an icon. As described in more detail in the examples set out below, displaying the additional selectable feature may implemented in various different ways.

In the case in which multiple selectable features are determined to be displayed in the inaccessible portion at 206, the additional selectable feature may be associated with the plurality of selectable features. For example, the additional selectable feature may be an expandable selectable feature such that, when the expandable selectable feature is selected, a plurality of additional selectable features associated with the expandable selectable feature may be displayed at 208. Each of the plurality of additional selectable features may correspond to a respective one of the plurality of selectable features displayed in the inaccessible portion of the touch-sensitive display 118.

In an example, all of the selectable features in the inaccessible portion of the touch-sensitive display 118 have a corresponding additional selectable feature that is displayed in the accessible portion of the touch-sensitive display 118. Alternatively, fewer than all of the selectable features may have a corresponding additional selectable feature displayed. For example, one or more additional selectable features may be displayed that correspond to the most commonly selected selectable features displayed in the inaccessible portion of the touch-sensitive display. In another example, the additional selectable features that are displayed may be pre-determined or configurable by the user. The other additional selectable features that are not displayed may be displayed by, for example, receiving an additional input from the user such as a gesture performed on the touch-sensitive display 118. In an example, fewer than all of the selectable features may have a corresponding additional selectable feature displayed when a virtual keyboard is displayed as part of the UI in order to reduce the area of the virtual keyboard that is obscured by the displayed additional selectable features. In another example, when a virtual keyboard is displayed as part of the UI, the additional selectable features are not displayed until a further input is received, such as, for example, a gesture performed on the touch-sensitive display 118.

In an example, each of the plurality of additional selectable features may be displayed with information associated with the corresponding selectable feature in order to visually indicate which selectable feature the additional selectable features corresponds to.

In an alternative example, rather than being expandable, the additional selectable feature may include a directional element that may be used to move a highlighting to a desired one of the selectable features displayed in the inaccessible portion of the touch-sensitive display 118. In this example, in response to receiving a selection of the additional selectable feature, the electronic device 100 performs the function associated with the highlighted selectable feature.

In another alternative example, the additional selectable feature may be a displayed window that includes an image of at least a portion of the inaccessible portion of the touch-sensitive display 118. In this example, the window may display, for example, a screen shot of the portions of inaccessible portion of the touch-sensitive display 118 that includes the selectable features determined at 206. In this example, the additional selectable features may be images of the selectable features determined at 206. Touching an image of a selectable feature displayed in the window causes the function associated with the selectable feature associated with the displayed image.

In another example, the additional selectable feature may be displayed as part of a keyboard, such as keyboard 120, displayed in a lower portion of the touch sensitive display 118.

At 210, a function associated with the selectable feature is performed in response to receiving a selection of the additional selectable feature. In this way, the user may select the additional selectable feature, which is easily accessible to a user during one-handed operation, in order to cause the electronic device 100 to perform the same function that would be performed had the user selected the corresponding selectable feature directly. In this way, the user is able to cause the electronic device 100 to perform the function in a one-handed operation by selecting the additional selectable feature, or by selecting the selectable feature directly utilizing, for example, a finger of the user's other hand.

Figure 4B:
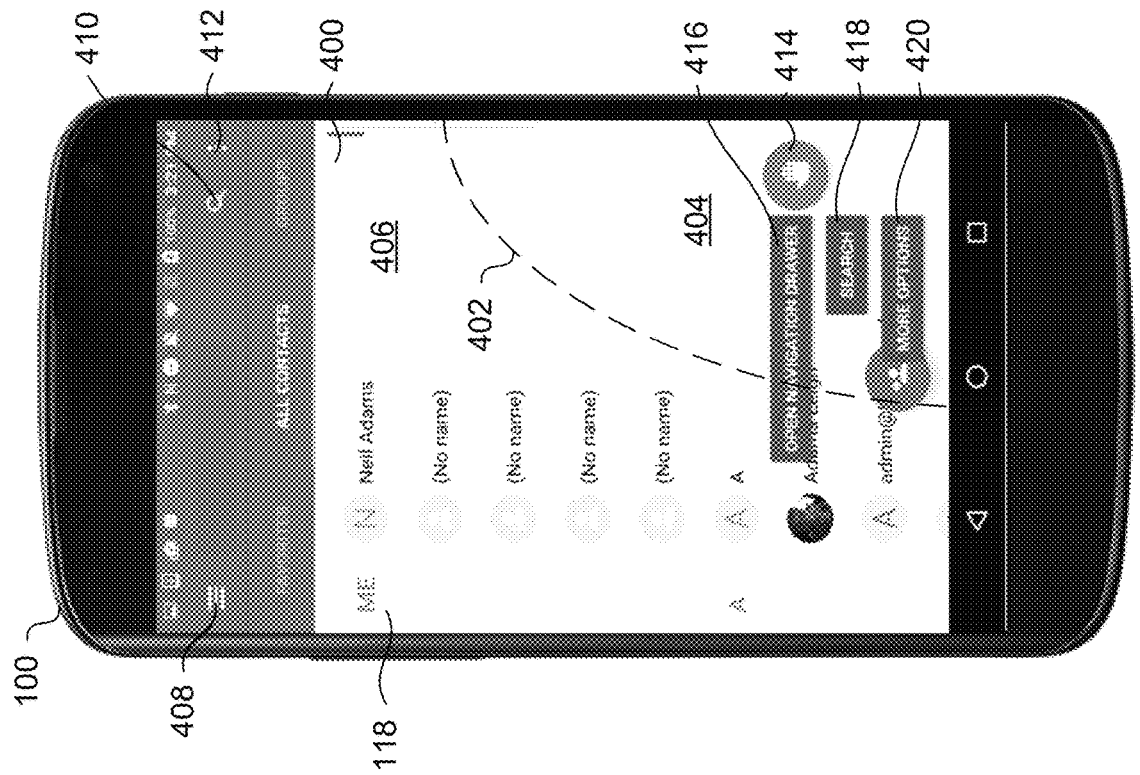
Figure 4A:
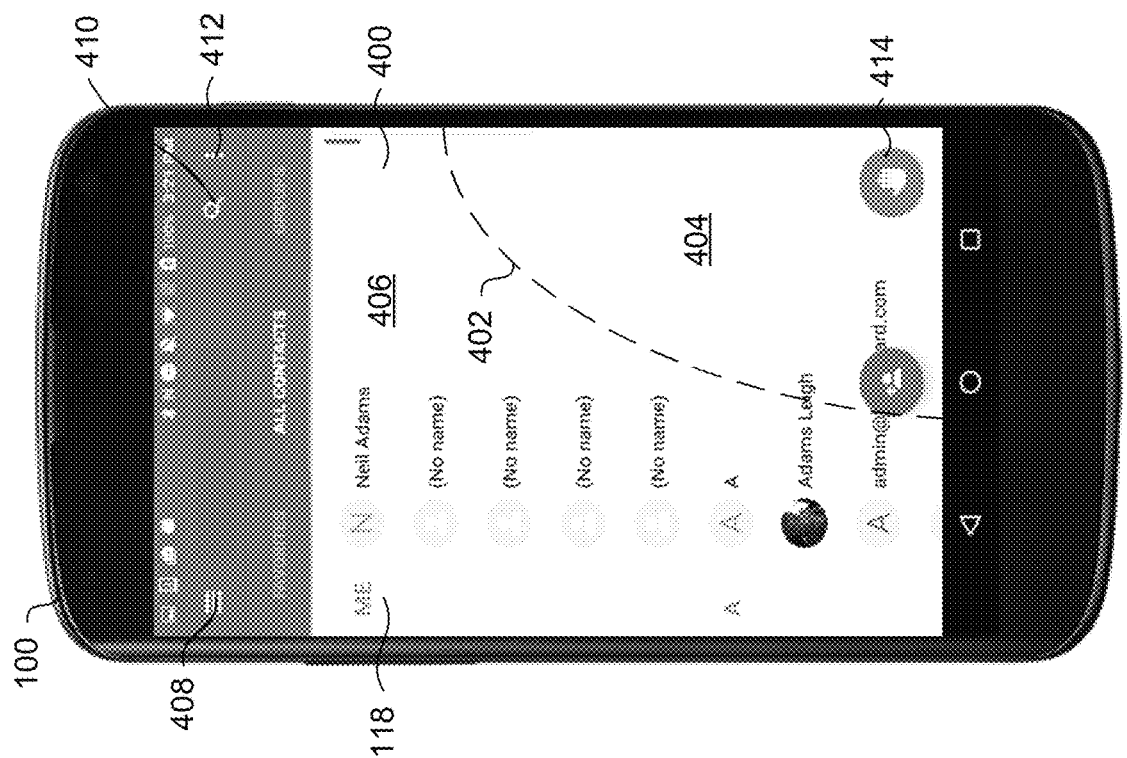

Referring now to FIG. 4A through FIG. 4E, one example is shown for a one-handed mode of an electronic device 100 according to the method described above with reference to FIG. 2 in which the additional selectable features is an expandable selectable feature. The electronic device 100 displays a UI 400 related to a contacts application. The dashed line 402 shown in FIG. 4A represents a boundary between the inaccessible portion 406 and the accessible portion 404 of the touch-sensitive display 118. The UI 400 in the example shown includes three selectable features 408, 410, 412 that are displayed in the inaccessible portion 406 of the touch-sensitive display 118. In the example shown in FIG. 4A, the first selectable feature 408 is associated with a function of opening a navigation drawer, the second selectable feature 410 associated with a function of entering a search, and the third selectable feature 412 associated with a function of displaying more options. As described above, an additional selectable feature 414 is displayed in the accessible portion 404 of the touch-sensitive display 118 in response to determining that the electronic device 100 is in a one-handed mode. The additional selectable feature 414 corresponds to the selectable features 408, 410, 412 such that the user may cause the electronic device 100 to perform the functions associated with the selectable features 408, 410, 412 by selecting the additional selectable feature 414, as described in more detail below.

In the example UI 400 shown in FIG. 4A, the inaccessible portion 406 includes a plurality of selectable features 408, 410, 412. In order for a user to select a desired function associated with the selectable features 408, 410, 412, the example additional selectable feature 414 may be expandable. As shown in FIG. 4B, when the additional selectable feature 414 is selected, a plurality of corresponding additional selectable features 416, 418, 420 are displayed in the accessible portion 404 of the touch-sensitive display 118. The first additional selectable feature 416 corresponds to the first selectable feature 408, the second additional selectable feature 418 corresponds to the second selectable feature 410, and the third additional selectable feature 420 corresponds to the third selectable feature 412.

In the example shown in FIG. 4B, each of the additional selectable features 416, 418, 420 includes text that is associated with the corresponding selectable feature 408, 410, 412. The text that is included in the additional selectable feature 416, 418, 420 may be determined from a description associated with the corresponding selectable feature 408, 410, 412. The description may be text associated with a selectable feature that may be utilized as, for example, hint text or accessibility text.

In another example, rather than text, each additional selectable feature 416, 418, 420 may include an image that is associated with the corresponding selectable feature 408, 410, 412. For example, if the additional selectable features 416, 418, 420 are implemented as a platform component, the platform may access the displayed UI components that are displayed as selectable features 408, 410, 412 in order to obtain the image. Alternatively, the images may be obtained by taking a snapshot of the screen at the location of each of the selectable features 408, 410, 412, or by providing an application program interface (API) such that an application provides an image when a selectable feature of the application is created, similar to the text included in the description associated with the selectable feature 408, 410, 412 as described above.

FIG. 4C shows the example UI 400 after a user has selected additional selectable feature 416 from the screen shown in FIG. 4B. Selecting the additional selectable feature 416 causes the electronic device 100 to perform the open navigation drawer function that is associated with selectable feature 408 corresponding to additional selectable feature 416. The open navigation drawer function causes the navigation menu 422 of the UI 400 to be displayed on the touch-sensitive display 118, as shown in FIG. 4C.

FIG. 4D shows the example UI 400 after the user has selected the additional selectable feature 418 from the screen shown in FIG. 4B. Selecting the additional selectable feature 418 causes the electronic device 100 to perform the function of initiating a search functionality that is associated with selectable feature 410 corresponding to additional selectable feature 418. Initiating the search functionality in the example shown in FIG. 4D includes displaying a virtual keyboard 424, as well as displaying selectable features 426 and 428. In the example shown in FIG. 4D, selectable feature 426 is associated with a navigate up function and selectable feature 428 is associated with a feature that stops searching. Because the selectable features 426 and 428 in the example shown in FIG. 4D are displayed in the inaccessible portion 404 of the touch-sensitive display 118, the additional selectable feature 414 is displayed. Because multiple selectable features 426, 428 are displayed in FIG. 4D, the additional selectable feature 414 is an expandable selectable feature, as described above. Expandable selectable feature 414 expands to display additional selectable features 430 and 432 that correspond, respectively, to selectable features 426 and 428. The additional selectable features 430 and 432 in the example shown in FIG. 4D each include text associated with the corresponding selectable feature 426, 428. As described above, in another example, the additional selectable features 430, 432 may include other information associated with selectable features 426, 428 such as, for example, an image, rather than text.

In the situation in which the additional selectable features 430, 432 are displayed over the virtual keyboard 424, as in the example shown in FIG. 4D, the expandable selectable feature 414 and the additional selectable features 430, 432 may be displayed in response to a further input in order to avoid obscuring the virtual keyboard 424. For example, if a virtual keyboard 424 is displayed, then the expandable selectable feature 414 may be displayed only after a further gesture is performed. The gesture may be, for example, initiating in a non-display region of the touch-sensitive display 118. The displayed expandable selectable feature 414 may be hidden from view by performing a further input to facilitate the input via the virtual keyboard 424. In an example, when the expandable selectable feature 414 is selected only one of the additional selectable features 430, 430 which corresponds to the most frequently selected selectable feature 426, 428 may be displayed.

FIG. 4E shows the example UI 400 after the user has selected the additional selectable feature 420 from the screen shown in FIG. 4B. Selecting the additional selectable feature 420 causes the electronic device 100 to perform the display more options function associated with the selectable feature 412 corresponding to additional selectable feature 420. In the example shown in FIG. 4E, the display more options function causes the electronic device 100 to display a selectable feature 434 associated with a contact import/export function. In the example shown in FIG. 4E, selectable feature 434 is displayed in the inaccessible portion of the touch-sensitive display 118, and therefore the additional selectable feature 414 is displayed. Because only a single selectable feature 434 is displayed in the example UI 400 screen shown in FIG. 4E, the additional selectable feature 414 may not be expandable such that selecting the additional selectable feature 414 causes the electronic device 100 to perform the contact import/export function.

Referring now to FIGS. 5A to 5C, another example is shown for a one-handed mode of an electronic device 100 according to the method described above with reference to FIG. 2 in which the additional selectable features includes direction elements. In the example shown, a UI 500 is displayed on the touch-sensitive display 118 of the electronic device 100. The dashed line 501 represents a boundary between the accessible portion 503 and the inaccessible portion 505 of the touch-sensitive display 118. The UI 500 relates to a contacts list and is substantially similar to UI 400 describe above with reference to FIG. 4A. UI 500 includes selectable features 502, 504, and 506 displayed in an inaccessible portion 505 of the touch-sensitive display, which are substantially similar to selectable features 408, 410, 412 described previously and therefore are not further described here to avoid repetition. An additional selectable feature 508 is displayed in the accessible region 503 which corresponds to the 502, 504, 506.

In the example shown in FIG. 5A, the additional selectable feature 508 includes direction elements 510, 512 that may be utilized to move a highlighting 514 between the selectable features 502, 504, 506. The directional elements 510, 512 in the example shown in FIG. 5A are, respectively, left and right directional arrows. However, the additional selectable feature 508 may include any suitable directional element that may be utilized to move the highlighting 514 between selectable features 502, 504, 506 such as, for example, an icon that could be moved relative to the additional selectable element 508 that cause corresponding movement of the highlighting 514. Further, although the example shown includes two displayed direction elements 510, 512, corresponding to left and right movement, direction elements associated with other directions such as, for example, up and down may also be displayed in addition to, or in place of, the directional arrows 510, 512. In other examples, hardware elements such as, for example, a separate touch pad, touch sensors on the keys of a physical keyboard 120, or a fingerprint sensor with navigation control, may be utilized to move the highlighting 514 between selectable features 502, 504, 506.

FIG. 5B shows the UI 500 after the user has selected the right directional arrow 512, causing the highlighting 514 to move from the selectable feature 502 to selectable feature 504. FIG. 5C shows the UI 500 after the user has selected the additional selectable feature 508 while the selectable feature 504 is highlighted by highlighting 514. Selecting the additional selectable feature 508 causes the electronic device 100 to initiate the search functionality that is associated with the selectable feature 504 that was highlighted at the time that the additional selectable feature 508 was selected, which in this case is the search functionality. Similar to the example described above with reference to FIG. 4D, the search functionality includes displaying a keyboard 518 in a lower portion of the touch-sensitive display 118, as well as selectable features 514, 516 in the inaccessible portion 505 of the touch-sensitive display 118. Selectable feature 514, 516 are associated, respectively, with a navigate up function and a stop searching function, similar to selectable feature 426, 428 described with reference to FIG. 4D. Because multiple selectable feature 514, 516 are displayed in the inaccessible portion 505, the additional selectable feature 508 in FIG. 5C is displayed with associated directional elements 510, 512 to move the highlighting 514 between selectable elements 514, 516.

Figure 6:
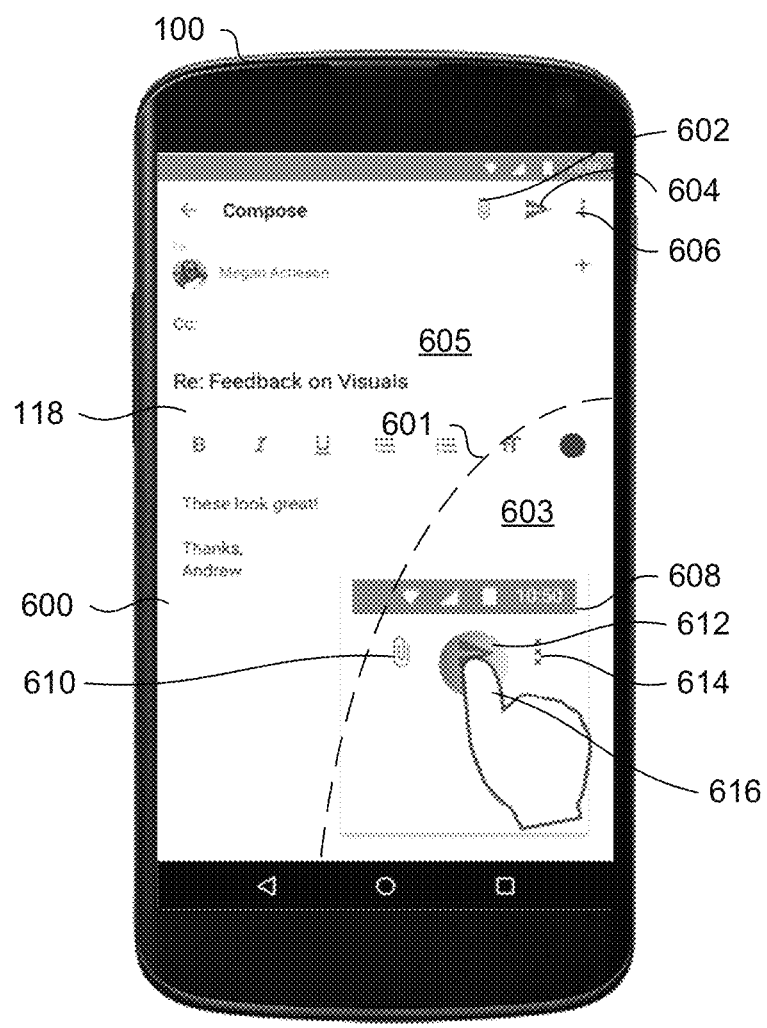
FIG. 6 illustrates another example of a one-handed mode of an electronic device in accordance with the flow chart of FIG. 2.

Referring now to FIG. 6, another example for a one-handed mode of an electronic device 100 is shown according to the method described above with reference to FIG. 2 in which the additional selectable feature includes a window having a screen shot of a portion of the inaccessible portion of the touch-sensitive display 118. The electronic device 100 displays on the touch-sensitive display 118 a UI 600 related to composing an email. The dashed line 601 represents a boundary between the accessible portion 603 and the inaccessible portion 605 of the touch-sensitive display 118.

The UI 600 includes selectable features 602, 604, 606 displayed in the inaccessible portion 605 of the touch-sensitive display 118. In the example shown, selectable feature 602 is associated with an add attachment function, selectable feature 604 is associated with a send function, and selectable feature 606 is associated with a display more options function. An additional selectable feature is displayed in the accessible portion of the touch-sensitive display 118. In the example shown, the additional selectable feature is a window 608 that includes an image of the portion of the inaccessible portion of the touch-sensitive display in which the selectable features 602, 604, 606 are displayed. The window 608 may include, for example, a screen shot of the portion of the inaccessible portion of the touch-sensitive display 118 in which the selectable features 602, 604, 606 are displayed. The images of each of selectable features 602, 604, 606 displayed window 608 provide, respectively, additional selectable features 610, 612, 614. As the UI 600 is changed due to interaction with the UI 600 by the user, the image included within the window 608 is also altered such that the window 608 dynamically corresponds to the UI 600 displayed at any given time. A user may select one of the additional selectable features 610, 612, 614 by touching the associated image displayed in the window 608. Selecting one of the additional selectable features 610, 612, 614 causes the electronic device 100 to perform the function associated with the corresponding selectable feature 602, 604, 606. In the example shown, a user's thumb 616 is selecting additional selectable feature 612 that corresponds to selectable feature 604. In response to receiving the selection of additional selectable feature 612, the electronic device 100 will perform the send function associated with selectable feature 604, which in this case is sending the email being composed.

Although the examples shown in FIGS. 4A through 4E, 5A through 5C, and 6 show examples of one-handed modes that is in a right handed mode in which the additional selectable features are displayed generally on the lower right portion of the touch-sensitive display 118, the examples of one-handed modes may be implemented in a left handed mode in which the additional selectable features are displayed generally in the lower left hand corner of the touch-sensitive display 118.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The present disclosure provides for a one-handed mode in an electronic device that facilitates selecting selectable features of a UI that are displayed in a portion of a touch-sensitive display that not easily accessible to a user. In the one-handed mode, an additional selectable feature that corresponds to the selectable features in the inaccessible portion is displayed in a portion of the touch-sensitive display that is easily accessible to a user operating the electronic device one-handed. In this way, a user may select the additional selectable feature during one-handed operation of the electronic device to cause the device to perform the function associated with the corresponding selectable feature. In addition, because the selectable features continue to be displayed on the touch-sensitive display in the one-handed mode, the user has the option to directly select the selectable features while the electronic device is in the one-handed mode using, for example, a finger of the user's other hand.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for an electronic device having a touch-sensitive display, the method comprising:
   displaying a user interface having selectable features on the touch-sensitive display;
   defining a boundary on the touch-sensitive display that separates a first defined region of the touch-sensitive display and a second defined region of the touch-sensitive display such that the first and second defined regions do not overlap;
   determining that the electronic device is in a one-handed mode, and in response to determining that the electronic device is in the one-handed mode:
   determining that at least one of the selectable features of the user interface is displayed in the second defined region of the touch-sensitive display;
   displaying, in the first defined region of the touch-sensitive display, an additional selectable feature associated with the at least one of the selectable features displayed in the second defined region while continuing to display the user interface including the at least one selectable features in the second defined region of the touch-sensitive display, wherein all of the additional selectable features displayed in the first defined region correspond only to selectable features displayed in the second defined region; and
   in response to receiving a selection of the additional selectable feature, performing a function associated with the at least one of the selectable features.

2. The method according to claim 1, wherein displaying the additional selectable feature comprises:
   displaying an expandable selectable feature; and
   in response to receiving a selection of the expandable selectable feature, displaying, for each of the at least one of the selectable features displayed in the second defined region of the display, a corresponding additional selectable feature; and
   wherein performing a function associated with the at least one selectable feature comprises, in response to receiving a selection of a corresponding additional selectable feature, performing a function associated with the selectable feature that corresponds to the corresponding additional selectable feature.

3. The method according to claim 2, wherein each corresponding additional selectable feature includes text from a content description associated with the selectable feature corresponding to the corresponding additional selectable feature.

4. The method according to claim 1, further comprising highlighting one of the at least one of the selectable features in the second defined region in the one-handed mode;
   wherein displaying the additional selectable feature includes displaying in the first defined region a directional feature associated with the additional selectable feature such that, in response to receiving a selection of the directional feature, moving the highlighting to another of the at least one of the selectable features displayed in the second defined region in a direction associated with the selected directional feature; and
   wherein in response to receiving a selection of the additional selectable feature, performing a function associated with the at least one of the selectable features comprises performing a function associated with the at least one of the selectable features that is highlighted in the second defined region when the selection of the additional selectable feature is received.

5. The method according to claim 1, wherein displaying the additional selectable feature in the first defined region of the touch-sensitive display comprises displaying a window in the first defined region of the touch-sensitive display that includes a portion of the user interface that includes the at least one selectable feature that is displayed in the second defined region of the touch-sensitive display, wherein the portion of the user interface included in the window does not include any portion of the first defined region.

6. The method according to claim 1, wherein displaying the additional selectable feature in the first defined region of the touch-sensitive display comprises displaying the additional selectable feature overlaying a keyboard displayed in a lower portion of the touch-sensitive display.

7. The method according to claim 1, wherein determining that the electronic device is in a one-handed mode comprises determining that the electronic device is being operated one-handed by the user.

8. The method according to claim 7, wherein determining that the device is being operated one-handed by the user comprises:
   determining which of a user's hands the electronic device is being operated by; and
   in response to determining that the electronic device is being operated by the user's right hand, defining the boundary comprises defining a boundary such that the first defined region is located on the right hand side of the touch-sensitive display; and
   in response to determining that the electronic device is being operated by the user's left hand, defining the boundary comprises defining a boundary such that the first defined region is located on the left hand side of the touch-sensitive display.

9. The method according to claim 8, wherein determining which of the user's hands the electronic device is being operated by is based on at least one of: a user setting; touches detected by touch sensors in a non-display area; a size of a touch area detected by the touch-sensitive display; or a shape of a touch area detected by the touch-sensitive display.

10. A non-transitory computer-readable storage medium having computer-readable code executable by at least one processor of an electronic device to:
    display a user interface having selectable features on a touch-sensitive display;
    define a boundary on the touch-sensitive display that separates a first defined region of the touch-sensitive display and a second defined region of the touch-sensitive display such that the first and second defined regions do not overlap;
    determine that the electronic device is in a one-handed mode, and in response to the determination that the electronic device is in the one-handed mode:
    determine that at least one of the selectable features of the user interface is displayed in the second defined region of the touch-sensitive display;

display, in the first defined region of the touch sensitive display, an additional selectable feature associated with the at least one of the selectable features displayed in the second defined region while continuing to display the user interface including the at least one selectable features in the second defined region of the touch-sensitive display, wherein all of the additional selectable features displayed in the first defined region correspond only to selectable features displayed in the second defined region; and in response to receipt of a selection of the additional selectable feature, perform a function associated with the at least one of the selectable features.

11. An electronic device comprising:
a touch-sensitive display;
a processor coupled to the touch-sensitive display and programmed to:
display a user interface having selectable features on the touch-sensitive display;
define a boundary on the touch-sensitive display that separates a first defined region of the touch-sensitive display and a second defined region of the touch-sensitive display such that the first and second defined regions do not overlap;
determine that the electronic device is in a one-handed mode, and in response to the determination that the electronic device is in the one-handed mode:
determine that at least one of the selectable features of the user interface is displayed in the second defined region of the touch-sensitive display;
display, in the first defined region of the touch sensitive display, an additional selectable feature associated with the at least one of the selectable features displayed in the second defined region while continuing to display the user interface including the at least one selectable features in the second defined region of the touch-sensitive display, wherein all of the additional selectable features displayed in the first defined region correspond only to selectable features displayed in the second defined region; and
in response to receipt of a selection of the additional selectable feature, perform a function associated with the at least one of the selectable features.

12. The electronic device according to claim 11, wherein the processor programmed to display the additional feature comprises the processor programmed to:
display an expandable selectable feature; and
in response to receipt of a selection of the expandable selectable feature, display, for each of the at least one of the selectable features displayed in the second defined region of the display, a corresponding additional selectable feature; and
wherein the processor programmed to perform a function associated with the at least one selectable feature comprises the processor programmed to, in response to receiving a selection of a corresponding additional selectable feature, perform a function associated with the selectable feature that corresponds to the corresponding additional selectable feature.

13. The electronic device according to claim 12, wherein each corresponding additional selectable feature includes text from a content description associated with the selectable feature corresponding to the corresponding additional selectable feature.

14. The electronic device according to claim 11, wherein the processor is further programmed to highlight one of the at least one of the selectable features in the second defined region in the one-handed mode;
wherein the processor programmed to display the additional selectable features includes the processor being programmed to display in the first defined region a directional feature associated with the additional selectable feature such that, in response to receipt of a selection of one of the directional element, the processor is programmed to move the highlighting to another of the at least one of the selectable features displayed in the second defined region in a direction associated with the selected directional feature; and
wherein in response to receipt of a selection of the additional selectable feature, the processor programmed to perform a function associated with the at least one of the selectable features comprises the processor programmed to perform a function associated with the at least one of the selectable features that is highlighted in the second defined region when the selection of the additional selectable feature is received.

15. The electronic device according to claim 11, wherein the processor programmed to display the additional selectable feature in the first defined region of the touch-sensitive display comprises the processor programmed to display a window in the first defined region of the touch-sensitive display that includes a portion of the user interface that includes the at least one selectable feature that is displayed in the second defined region of the touch-sensitive display, wherein the portion of the user interface included in the window does not include any portion of the first defined region.

16. The electronic device according to claim 11, wherein the processor programmed to display the additional selectable feature in the first defined region of the touch-sensitive display comprises the processor programmed to display the additional selectable feature overlaying a keyboard displayed in a lower portion of the touch-sensitive display.

17. The electronic device according to claim 11, wherein the determination that the electronic device is in a one-handed mode comprises the processor programmed to determine that the electronic device is being operated one-handed by the user.

18. The electronic device according to claim 17, wherein the determination that the device is being operated one-handed by the user comprises the processor being programmed to:
determine which of a user's hands the electronic device is being operated by; and
in response to the determination that the electronic device is being operated by the user's right hand, define the boundary such that the first defined region is located on the right hand side of the touch-sensitive display; and
in response to the determination that the electronic device is being operated by the user's left hand, define the boundary such that the first defined region is located on the left hand side of the touch-sensitive display.

19. The electronic device according to claim 18, wherein the determination which of the user's hands the electronic device is being operated by is based on at least one of: a user setting; touches detected by touch sensors in a non-display area; a size of a touch area detected by the touch-sensitive display; or a shape of a touch area detected by the touch-sensitive display.

* * * * *